(12) United States Patent
Kumpfmüller

(10) Patent No.: US 7,231,827 B2
(45) Date of Patent: Jun. 19, 2007

(54) PRESSURE TRANSDUCER

(75) Inventor: Hans-Georg Kumpfmüller, Gleiszellen-Gleishorbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/571,283

(22) PCT Filed: Sep. 3, 2004

(86) PCT No.: PCT/EP2004/009863

§ 371 (c)(1),
(2), (4) Date: Mar. 9, 2006

(87) PCT Pub. No.: WO2005/026682

PCT Pub. Date: Mar. 24, 2005

(65) Prior Publication Data

US 2006/0283256 A1 Dec. 21, 2006

(30) Foreign Application Priority Data

Sep. 12, 2003 (DE) .............................. 103 42 368

(51) Int. Cl.
*G01L 7/00* (2006.01)

(52) U.S. Cl. .............................. 73/706; 73/715; 73/753

(58) Field of Classification Search ........... 73/700–756
See application file for complete search history.

(56) References Cited

U.S. PATENT DOCUMENTS

| 4,825,685 A | 5/1989 | Breimesser |
| 4,896,525 A | 1/1990 | Breimesser |
| 5,114,664 A | 5/1992 | Terhune |
| 5,760,310 A | 6/1998 | Rud, Jr. et al. |
| 2005/0241363 A1* | 11/2005 | Krippner et al. .............. 73/1.57 |

FOREIGN PATENT DOCUMENTS

| DE | 37 05 900 A1 | 9/1988 |
| DE | 37 05 901 C2 | 9/1988 |
| JP | 06307962 A | 11/1994 |

* cited by examiner

*Primary Examiner*—Edward Lefkowitz
*Assistant Examiner*—Jermaine Jenkins

(57) ABSTRACT

The pressure transducer provided with a measuring chamber is separated by a medium which is to be measured by a separation membrane. A piezoelectric element is arranged on the measuring chamber which is filled with silicone oil, thereby enabling the specific volume of said chamber to be modified. An adjustable path of the measuring signal is compared to a reference path and considerable deviations indicate an error on the membrane. As a result, the state of the separation membrane can be monitored when the pressure transducer is in the installed state.

6 Claims, 2 Drawing Sheets

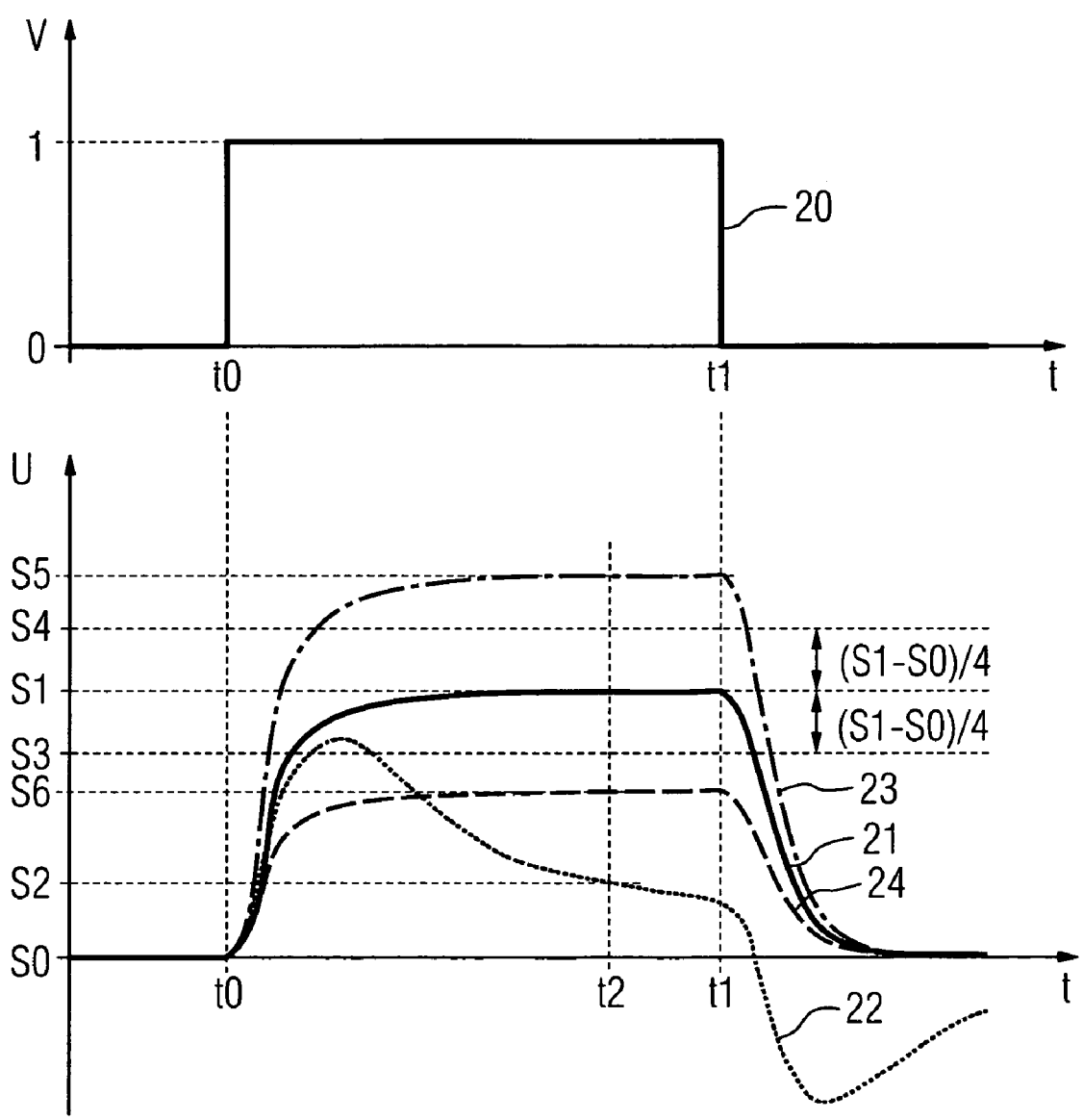

PRESSURE TRANSDUCER

CROSS REFERENCE TO RELATED APPLICATIONS

This application claims priority to the German application No. 10342368.0, filed Sep. 12, 2003, and to the International Application No. PCT/EP2004/009863, filed Sep. 3, 2004 which are incorporated by reference herein in their entirety.

FIELD OF INVENTION

The invention relates to a pressure transducer provided with a pressure sensor located in a housing for converting a pressure to be measured into a measuring signal.

BACKGROUND OF INVENTION

A pressure transducer of this type, which enables the measurement of an absolute pressure of a process medium or of a pressure difference, is known from DE 37 05 901 C2. A pressure measuring cell with a housing is disclosed there, in which a measuring membrane is arranged which subdivides a housing interior into a measuring chamber and a reference chamber. The measuring chamber and the reference chamber are each provided with a pressure channel which, when the pressure measuring cell is used in a difference pressure transducer, leads in each case to a separation membrane which separates the measuring chamber and the reference chamber respectively from a measuring medium at which the pressure difference is to be measured between different measuring points. The two chambers are filled with a pressure transfer fluid, a silicone oil for example. In order to generate an electrical measuring signal which changes depending on the applied pressure difference, it is possible for the measuring membrane to carry a pressure sensor which for example is made from silicon and is provided with elongation resistances. By using a facility for evaluating the measuring signal, it is possible to generate and output a measurement value from the electrical measuring signal. Opposite the measuring membrane in the reference chamber is located a piezoelectric element which is provided with electrical connections for control purposes. When energized, this piezoelectric element serves to modulate the hydrostatic pressure in the pressure transfer fluid of the reference chamber. Rapid modulation operations are applied in order that this increase in hydrostatic pressure takes effect in the reference chamber. The equalization of pressure by way of the separation membrane adjacent to the pressure channel can then be ignored. The change in pressure is transmitted to the measuring membrane by means of the pressure transfer fluid. When the amplitude of the pressure modulation is known, the sensitivity of the pressure measuring cell is inferred directly from the amplitude of the corresponding modulation of the measuring signal. Self-monitoring of the pressure measuring cell for malfunctions, particularly of the measuring membrane, is thus enabled during operation and without causing any interruption of the measurement process. The known pressure transducer has the disadvantage, however, that changes in or damage to the separation membrane cannot be identified.

SUMMARY OF INVENTION

When pressure transducers are used in process control systems it can happen that a separation membrane is chemically attacked or mechanically damaged by the measuring medium. If a hole occurs in the membrane, the measuring medium enters the measuring chamber or the reference chamber and reaches the pressure sensor which reacts sensitively to the measuring medium. Before a total failure occurs, errored measurement values which the user does not notice can occur during a transition period. This can have serious consequences in a process control system. In addition, as a result of the measuring medium deposits can occur on a separation membrane which impair the transfer of pressure to the sensor. Errored measurements consequently result which are difficult for the user to detect. Errors of this type can be recognized solely by means of a visual inspection which requires a preceding removal of the pressure transducer.

An object of the invention is to set down a pressure transducer which permits monitoring of the state of a separation membrane without requiring removal of the pressure transducer.

In order to achieve this object, the new pressure transducer of the type mentioned at the beginning has the features set down in the claims. Advantageous embodiments of the invention are described in the dependent claims.

The invention has the advantage that a reliable statement concerning the state of a separation membrane can be obtained without, for example, first having to remove the pressure transducer from a pipe line. The diagnostics can thus be performed virtually during operation of the pressure transducer. In addition, an ageing process of the separation membrane can be recognized and it is possible to react to this in good time before a failure of the pressure transducer threatens and the process control system in which the pressure transducer is being operated possibly comes to a standstill. A further advantage consists in the fact that the measurement value delivered by a pressure transducer according to the invention is more reliable because changes to the separation membrane, for example deposits or material erosion effects resulting from corrosion or abrasion, which could corrupt the measurement value, can be detected and reported automatically in the case of the new pressure transducer through diagnostics. In addition, the new pressure transducer has the advantage that a possible visual inspection, which has previously been required in the case of certain measuring media, is dispensed with and there is thus considerably less effort involved in the monitoring of the state of a separation membrane.

A hole in a separation membrane can be diagnosed with a particularly high degree of reliability if the value of the measuring signal, which presents itself within a predefinable delay period after the beginning of an essentially sudden change of volume in the measuring chamber, is compared as the characteristic value for the path presenting itself for the measuring signal with a corresponding characteristic value for the reference path and a signal for indicating a hole in the separation membrane is output if the corresponding characteristic value for the reference path is not reached by-more than a predefinable extent. This takes advantage of the fact that a change in pressure caused by a change in volume disappears after a certain delay period as a result of a leakage in the separation membrane.

In order to reliably diagnose deposits on the separation membrane, the maximum value of the measuring signal resulting after an essentially sudden change of volume can advantageously be compared as a characteristic value for the path presenting itself for the measuring signal with a corresponding characteristic value for the reference path and a signal for indicating deposits on the separation membrane can be output if the corresponding characteristic value for the reference path is exceeded by more than a predefinable extent. In analogous fashion it is advantageously possible to diagnose material erosion of the separation membrane by monitoring whether the corresponding characteristic value for the reference path is not reached by more than a predefinable extent.

In an advantageous manner, preventive maintenance can be performed on a pressure transducer prior to an imminent failure if a trend statement, which enables maintenance personnel to estimate when an imminent failure is to be expected, is determined and output by the evaluation unit on the basis of timing changes in a characteristic value for the path presenting itself for the measuring signal in the case of temporally spaced diagnostic operations, carried out cyclically for example.

Providing a piezoelectric element for changing the volume of the measuring chamber, which can be controlled by the evaluation unit, has the advantage that there is a low power requirement for changing the volume and the means for achieving this can be implemented with a low resource requirement.

The functions of an evaluation unit required for monitoring a separation membrane can also be implemented without a major resource requirement by means of suitable configuration of an operating program in a computer unit when an evaluation unit based on a microprocessor is used. The manufacturing costs of the pressure transducer are thus advantageously hardly affected by the new diagnostic method.

BRIEF DESCRIPTION OF THE DRAWINGS

The invention and its embodiments and advantages will be described in detail in the following with reference to the drawings in which an exemplary embodiment of the invention is represented.

In the drawings:

FIG. 2 shows a timing diagram with qualitative signal paths.

DETAILED DESCRIPTION OF INVENTION

Figure 1:
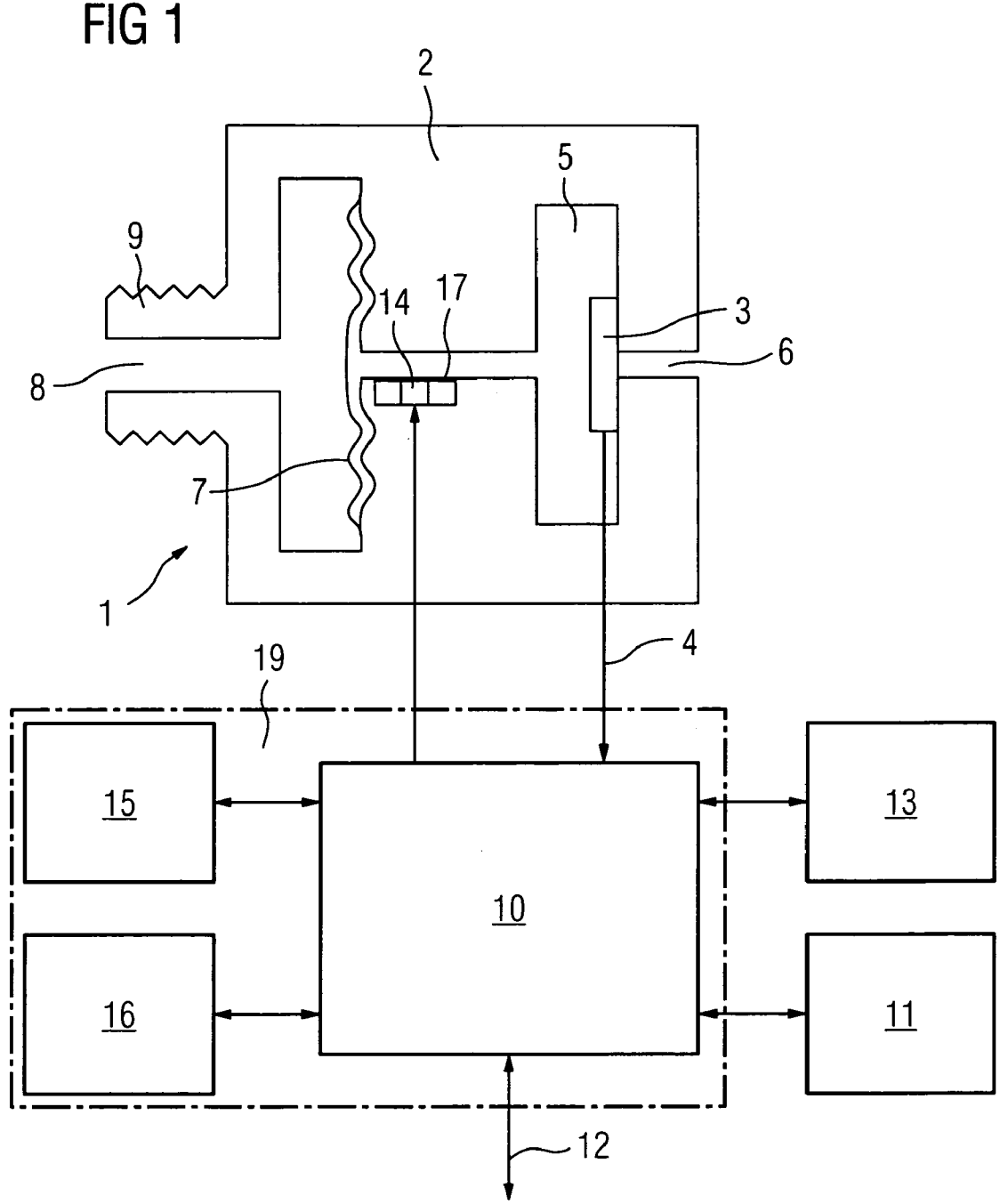
FIG. 1 shows a schematic diagram of a pressure transducer for absolute pressure.

FIG. 1 shows a block diagram of a pressure transducer. The pressure transducer has an essentially axisymmetric pressure measuring cell 1 with a housing 2 in which is arranged a pressure sensor 3 for converting a pressure to be measured into an electrical measuring signal 4. The pressure sensor 3 is situated between a measuring chamber 5 and a channel 6 which serves to deliver a reference pressure. The measuring chamber 5 is filled with silicone oil as a pressure transfer fluid. Air at the relevant current ambient pressure is delivered to the pressure sensor 3 through the channel 6. With regard to the exemplary embodiment illustrated, the measuring signal 4 thus represents the absolute pressure relative to the ambient pressure. In order to protect the sensor, the pressure transfer fluid in the measuring chamber 5 is separated by means of a separation membrane 7 from a process medium 8 which is introduced through a channel having the pressure to be measured into the pressure measuring cell 1. The pressure sensor 3 is protected by the separation membrane 7 against damage by aggressive media. A threaded stud 9 serves to facilitate installation of the pressure measuring cell 1 into a pipe line of a process control system which is not shown in the drawing for the sake of clarity. The measuring signal 4 is fed to a microprocessor 10 which evaluates the signal 4 in order to generate a measurement value, outputs the measurement value on a display 11 and conveys it for further processing by way of a field bus 12 to a control station for the process control system, which again is not shown in the figure for the sake of clarity. The microprocessor 10 is provided with a suitable operating program for performing the measurements and the communication. A keyboard 13 allows in puts from an operator and outputs to the operator can take place via the display 11. In order to perform diagnostics on the separation membrane 7 a piezoelectric element 14, which is to be found on the measuring chamber 5 of the pressure measuring cell 1 and is separated from the measuring chamber 5 by a membrane 17, can be controlled by the microprocessor 10 in such a manner that the volume of the measuring chamber 5 changes in accordance with an essentially predetermined timing path. In the physical sense, it is not the size of the volume of the measuring chamber 5 that is changed by the piezoelectric element 14, rather the volume contained within the measuring chamber 5 is shifted such that the separation membrane 7 experiences a positional change through the shift in volume. It is thus the position of the pressure transfer fluid in the pressure measuring cell that changes. A memory 15 serves to store a path for the measuring signal 4 which presents itself in response to the change in volume in the case of an intact separation membrane 7. This path is recorded during initial commissioning of the sensor in the process control system. A memory 16 serves to store paths for the measuring signal 4 which present themselves during subsequent operation of the pressure transducer in response to a change in volume which is generated in order to perform diagnostics. From the paths stored in the memories 15 and 16 the microprocessor 10 determines characteristic values corresponding to one another, compares these with on e another and derives different statements about the state of the separation membrane 7 from the result of the comparison. In the event of an error, a signal indicating the error will be output on the display 11 or by way of the field bus 12 in order that appropriate error recovery measures can be initiated by the operations or maintenance personnel. Microprocessor 10, memory 15 and memory 16 thus constitute components of a facility 19 for evaluating the measuring signal 4.

As an alternative to the described exemplary embodiment, it is of course possible to store simply the characteristic values determined for diagnostic purposes in the memories 15 and/or 16 instead of the complete measuring signal paths.

Although the invention is described here with reference to an exemplary embodiment having a pressure measuring cell for absolute pressure, it is however applicable in analogous fashion with regard to a measuring cell for difference pressure.

With reference to the signal paths shown FIG. 2, the operating principle of the diagnostic process will be described in detail in the following. In the diagrams according to FIG. 2 the qualitative signal paths are shown with the time t on the abscissa and the respective signal amplitude V and U on the ordinates. Since the state of the separation membrane 7 (FIG. 1) changes only gradually, a cyclical execution of the diagnostic process will suffice. In order to produce a change in volume of the measuring chamber 5 (FIG. 1) according to an illustrated path 20, the piezoelectric element 14 (FIG. 1) is energized with a squarewave pulse which begins at point in time t0 and ends at point in time t1. In response to this change in volume, in the case of an intact separation membrane 7 (FIG. 1) a path 21 presents itself for the measuring signal 4 (FIG. 1). At point in time t0 the measuring signal begins to distance itself from its initial value S0 and gradually approaches a new final value S1. The reason for this is the change in the volume under the separation membrane 7 (FIG. 1) and the associated change in the position of the separation membrane. As a result of the elasticity of the separation membrane 7 this positional shift results in a change of pressure in the measuring chamber 5 and a corresponding change in the measuring signal 4. The invention is based on the knowledge that the behavior of the separation membrane changes in the event of changes in volume in the measuring chamber if a leakage point occurs in the separation membrane, if deposits form on the separation membrane and/or if the thickness of the separation membrane is reduced due to abrasion or chemical reaction with the measuring medium. The path 21 is used as a reference path for comparison with later measuring signal paths which are recorded in the event of a change in volume with essentially the same timing path 20. If a measuring signal path recorded later during operation deviates significantly from the reference path 21, then a defective membrane state can be inferred from this.

In the case of a hole in the separation membrane, a path 22 for the measuring signal will present itself in response to a sudden change in volume. Shortly after the point in time t0 the path 22 is still similar to the reference path 21. However, the measuring signal again heads prematurely for the initial value S0 because pressure transfer fluid can flow to the process medium through the leak in the membrane, and an equalization of pressure thus takes place. A leak in the separation membrane can thus be reliably detected if at a later point in time, at point in time t2 in the exemplary embodiment illustrated, which follows the point in time t0 by a predefined delay period, a value S2 for the path 22 which presents itself for the measuring signal is determined is compared with the value S1 which the reference path 21 had assumed at a corresponding point in time, and a leak is recognized and reported if the value S2 deviates by more than a predefined degree, in the example illustrated by more than 25% of the difference between the values S1 and S0. The value S2 for the path 22 lies significantly below a threshold value S3 calculated in this way, with the result that a leak in the membrane is reliably recognized.

The presence of deposits on the separation membrane 7 (FIG. 1) reduces the latter's elasticity. A change in volume of the measuring chamber 5 thus results in a more marked change in pressure and a correspondingly more marked change in the measuring signal 4 (FIG. 1) than in the case of the reference measurement, as is represented qualitatively in FIG. 2 by a path 23. In order to detect an error of this type in the separation membrane, as the characteristic value for the path 23 the latter's maximum value S5 is advantageously compared with the maximum value S1 for the path 21 as a reference characteristic value and an error is recognized and output if the two values deviate from one another by more than a quarter of the difference between the values S1 and S0, in other word s if the maximum value S5 exceeds a threshold value S4.

On the other hand the elasticity of the separation membrane is increased in the case of material erosion, caused by abrasion or chemical reaction for example, and the separation membrane is more easily able to follow a change in volume of the measuring chamber. In FIG. 2, a path 24 which presents itself in the case of a measuring membrane if the wall thickness of the membrane has already been significantly reduced by material erosion effects is represented qualitatively. In similar fashion to the detection of deposits on the separation membrane, it is thus also possible with regard to material erosion effects by means of a simple comparison of a maximum value S6 for the path 24 with the threshold value S3, which lies below the maximum value S1 for the path 21 by a predefined degree, here a quarter of the difference between the values S1 and S0; to recognize unacceptably marked material erosion and indicate this as an error.

Since such types of changes to the separation membrane happen over an extended period of time, it is possible to derive and output a trend statement in a simple manner when performing a cyclical execution of the described diagnostic process, on the basis of the changes in characteristic values over time, for example the maximum values of the paths presenting themselves for the measuring signal. For example, a trend statement can specify the point in time at which deposits will exceed a level which is still reasonable. Preventive maintenance of the pressure transducer is thus possible and the additional costs that would be associated with an unexpected error and its elimination can be avoided.

A change in volume according to the path 20 in FIG. 2 has proved to be particularly advantageous. The diagnostic process can of course also be carried out with other types of paths, and characteristic values deviating from the illustrated exemplary embodiment for the paths of the measuring signal consequently presenting itself can be evaluated for the purposes of error detection.

The invention claimed is:

1. A pressure transducer, comprising:
a pressure sensor arranged in a housing for converting a measured pressure value into an electrical measuring signal;
a measuring chamber separated from a medium to be measured by a separation membrane, the measuring chamber filled with a pressure transfer fluid for transmitting the pressure to the pressure sensor;
a piezoelectric element arranged in the measuring chamber; and
an evaluation unit for evaluating the electrical measuring signal, the evaluation unit configured to:
compare a characteristic value representing a timely progression of the electrical measuring signal to a reference characteristic value representing a reference timely progression, the timely progression of the electrical measuring signal corresponding to a change in volume; and
output a signal indicating an error based on a difference between the characteristic value and the reference characteristic value, wherein the piezoelectric element is configured to be controlled such that the volume of the measuring chamber can be changed according to a desired predetermined timely volume progression.

2. The pressure transducer according to claim 1, wherein the evaluation unit is configured to output a signal indicating a leak in the separation membrane, the output signal output if a value of the electrical measuring signal undershoots the corresponding characteristic value of the reference timely progression by more than a first predetermined value, the value of the electrical measuring signal measured after a step-shaped volume change and after a predetermined delay time period has elapsed upon occurrence of the step-shaped volume change, and the measured value of the electrical measuring signal used as the characteristic value.

3. The pressure transducer according to claim 1, wherein the evaluation unit is configured to output a signal indicating debris on the separation membrane, the output signal output if a maximum value of the electrical measuring signal exceeds the corresponding characteristic value of the reference timely progression by more than a second predetermined value, the maximum value of the electrical, measuring signal measured after a step-shaped changed in volume, and the measured maximum value used as the characteristic value.

4. The pressure transducer according to claim 1, wherein the evaluation unit is configured to output a signal indicating material erosion of the separation membrane, the output signal output if a maximum value of the electrical measuring signal undershoots the corresponding characteristic value of the reference timely progression by more than a second predetermined value, the maximum value of the electrical measuring signal measured after a step-shaped changed in volume, and the measured maximum value used as the characteristic value.

5. The pressure transducer according to claim 1, wherein the evaluation unit is configured to output a trend statement based on a timely progression of the characteristic value, the timely progression of the characteristic value corresponding to measuring the characteristic value at discrete points in time.

6. The pressure transducer according to claim 1, wherein the piezoelectric element is controlled by the evaluation unit.

* * * * *